3,812,189
N-(2,2-DILOWERALKOXYALKYL) - 2,2 - DILOWER-ALKOXYLOWERALKANAMIDINES AND THEIR ACID ADDITION SALTS

Jackson Pollard English, Grantham, N.H., and Gerald Berkelhammer, Princeton, N.J., assignors to American Cyanamid Company, Stamford, Conn.
No Drawing. Filed July 24, 1972, Ser. No. 274,560
Int. Cl. C07c *123/00*
U.S. Cl. 260—564 R          5 Claims

ABSTRACT OF THE DISCLOSURE

The compounds N - (2,2-diloweralkoxyalkyl)-2,2-diloweralkoxyloweralkanamidines, the acid addition salts thereof and a method for their preparation, are described. A process for the preparation of imidazole-2-carboxaldehyde and 2-imidazolylalkyl ketones utilizing the above described compounds as intermediates are also described. The latter compounds are useful as intermediates in the preparation of 2-amino-5-(2-imidazolyl)-1,3,4-thiadiazoles, which are highly effective antibacterial and antiprotozoal agents.

BACKGROUND AND PRIOR ART

Imidazole-2-carboxaldehyde and 2-imidazolylalkyl ketones are described in the literature along with methods for their preparation. Moreover, it has been disclosed in the literature that such compounds have been employed in the manufacture of highly effective antibacterial agents and antiprotozoal agents. The Berkelhammer et al. U.S. Pat. 3,600,399, issued Aug. 17, 1971, is of particular interest in this area, since it describes the manufacture of a number of 2-amino-5-(2-imidazolyl)-1,3,4-thiadiazoles starting from the above-named compounds and establishes that the thiadiazoles thus prepared are highly effective antibacterial and antiprotozoal agents.

Although there are a number of procedures described for the manufacture of imidazole-2-carboxaldehyde and the 2-imidazolylalkyl ketones, up to the present time none has been entirely satisfactory since all are time consuming, tedious and relatively costly, as is evident from the several literature routes hereinafter described.

A. LITERATURE ROUTES TO IMIDAZOLE-2-CARBOXALDEHYDE

Route 1

1.

$$C_6H_5CH_2NH_2 + ClCH_2CH(OC_2H_5)_2 + KSCN + HCl \xrightarrow[87\%]{Ref. 1}$$

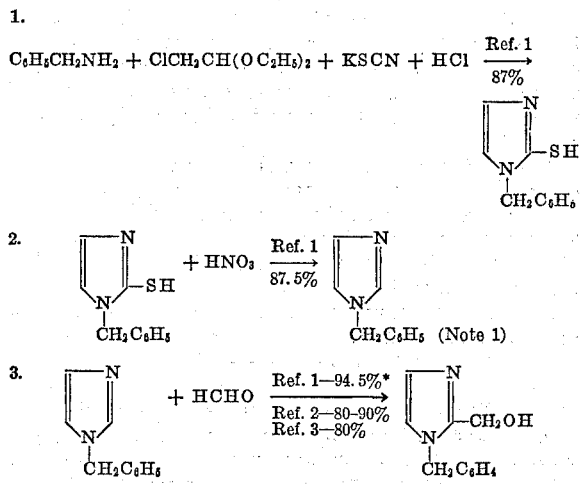

*as the hydrochloride salt

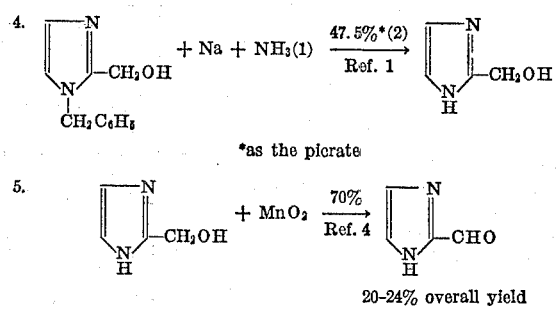

*as the picrate 20-24% overall yield

Notes:
(1) This compound has also been made (A. Roe, J. Chem. Soc. *1963*, 2195) by direct benzylation of imidazole in the difficultly handled system of sodium and liquid ammonia.
(2) Ref. 2 reports a 94% yield in this step, but this required an impractical continuous extraction of 8½ days duration.

Route 2

1–3. (As in Route 1)

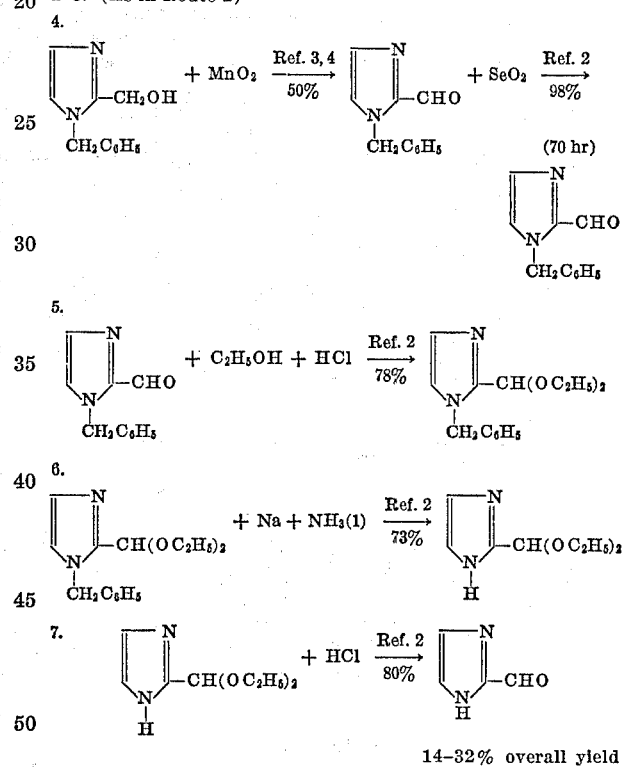

Route 3

1–2. (As in Route 1)

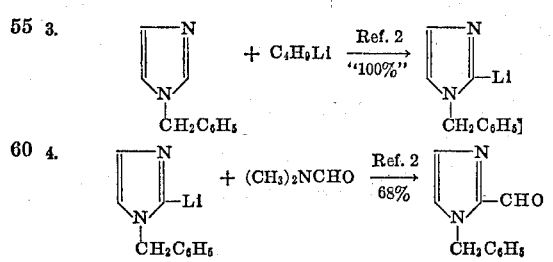

5–7. (As in Route 2).

Overall yield of imidazole-2-carboxaldehyde: 24%.
References:
1. R. G. Jones, J. Am. Chem. Soc. 71, 383 (1949).
2. P. E. Iverson and H. Lund, Acta Chem. Scand. 20, 2649 (1966).
3. P. Fourinari, P. de Cointet, and E. Laviron, Bull. Soc. Chim. *1968*, 2438.
4. H. Schubert and H. D. Rudorf. Angew. Chem. International Ed. 5, 674 (1966).

B. LITERATURE ROUTE TO 2-ACETYLIMIDAZOLE
Reference: A. M. Roe, J. Chem. Soc., 2195 (1963).

1. (As in steps 1 and 2 in Route 1) or:

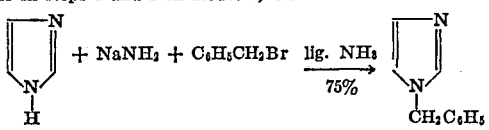

2. 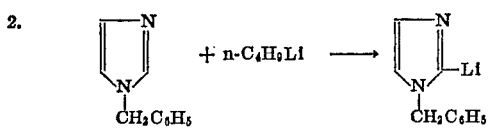

3. 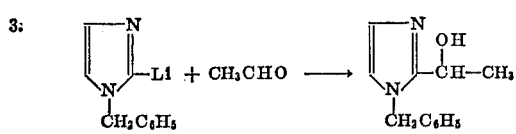

4. 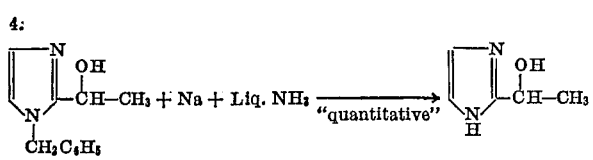

5. 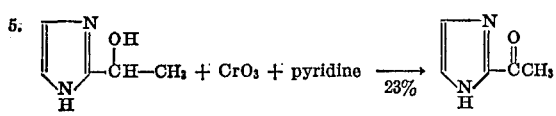

Overall yield 3.8%

SUMMARY OF THE INVENTION

The present invention relates to novel compounds of the formula:

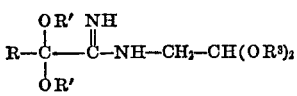

wherein R is hydrogen or alkyl $C_1$–$C_4$ and R' and $R_3$ are alkyl $C_1$–$C_4$; and the acid addition salts thereof. The invention also relates to a method for preparing the above-identified compounds and their acid addition salts, and, further, to a process for the preparation of imidazole-2-carboxaldehyde and 2-imidazolylalkyl ketones utilizing said compounds as intermediates or starting materials for such preparation.

In accordance with this invention, compounds having the structure:

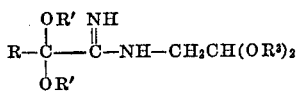

where R is hydrogen or alkyl $C_1$–$C_4$ and R' and $R^3$ are alkyl $C_1$–$C_4$ groups; can be prepared by the reaction of a 2,2-dialkoxyloweralkanonitrile with an alkali metal alkoxide, preferably a sodium or potassium alkoxide $C_1$–$C_4$, in the presence of a solvent such as lower alcohol $C_1$–$C_4$. The reaction can be carried out at a temperature between about 0° C. and 70° C. and preferably between about 20° and 50° C. Graphically the reaction can be illustrated as follows:

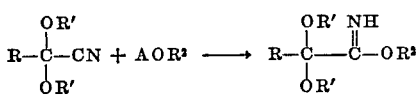

wherein R and R' are as described above; A is an alkali metal preferably sodium or potassium and $R^2$ is alkyl ($C_1$–$C_4$). The reaction mixture containing the thus-formed 2,2-dialkoxyloweralkanimidate is then treated with a dialkylacetal of aminoacetaldehyde in the presence of a strong mineral or organic acid to yield the 2,2-dialkoxy-loweralkanamidine acid addition salt. The reaction may be shown as follows:

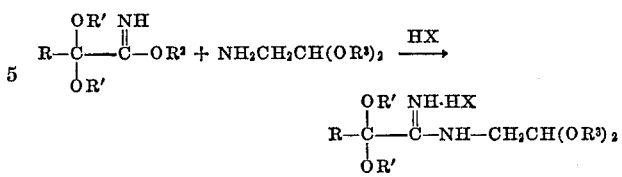

wherein R, R', $R^2$ and $R^3$ are as described above and X is the anion of a mineral acid such as hydrochloric acid, sulfuric acid, hydrobromic acid, nitric acid or the like or a strong organic acid such as an alkyl $C_1$–$C_4$ sulfonic acid or trifluoroacetic acid. The reaction is generally carried out between about 0° to 50° C. and sufficient quantity of acid is added to the reaction mixture to make it acidic.

The 2,2-dialkoxyloweralkanamidine acid addition salt is then further treated with a strong acid at an elevated temperature to effect cyclization thereof. Acids such as hydrochloric acid, sulfuric acid, hydrobromic acid and the like are preferred. The reaction which takes place may be illustrated as follows:

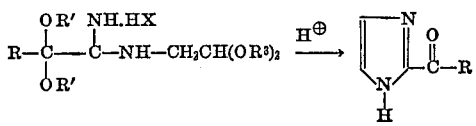

where R is hydrogen or alkyl $C_1$–$C_4$.

As disclosed in Berkelhammer et al. Pat. 3,600,399, issued Aug. 17, 1971, imidazole-2-carboxaldehyde, imidazole-2-carboxaldehyde thiosemicarbazone and the like are compounds which have utility as starting materials and/or intermediates for the preparation of 2-amino-5-(2-imidazolyl)-1,3,4-thiadiazoles which are highly effective antibacterial and antiprotozoal agents. Procedures used in the preparation of active compounds are described in the above-said patent.

SPECIFIC DISCLOSURE

This invention is further illustrated by the examples set forth below which describe in detail the preparation of straight chain compounds and their cyclization to imidazole derivatives.

EXAMPLE 1

Preparation of N-(2,2-diethoxyethyl)-2,2-diethoxyacetamidine hydrochloride

A solution of 1.25 g. of sodium methoxide in 90 ml. of methanol is added to 30 g. of 92% pure diethoxyacetonitrile. There is a mild exotherm. The reaction mixture is allowed to stand for 2 hours at room temperature. To the thus-formed methyl diethoxyacetimidate is added 30.9 g. of the diethylacetal of aminoacetaldehyde, followed by the portionwise addition, with exterior ice cooling, of 28 ml. of saturated ethanolic hydrogen chloride. The temperature is kept below 42° C. during the addition of the acid and the final solution is acidic to pH indicator paper. The reaction mixture is allowed to stand at room temperature for one hour and filtered. The filtrate is evaporated under reduced pressure, leaving 65.8 g. (96% based on diethoxyacetonitrile) of N-(2,2-diethoxyethyl)-2,2-diethoxyacetamidate hydrochloride as a light yellow viscous oil. The infrared spectrum of this compound has a strong band at 1700 cm.$^{-1}$, representing absorption of the imine function, as well as strong broad bands at 1060 cm.$^{-1}$ and 1120 cm.$^{-1}$.

EXAMPLE 2

Preparation of imidazole-2-carboxaldehyde

A solution of 65.8 g. of N-(2,2-diethoxyethyl)-2,2-diethoxyacetamidine hydrochloride in 150 ml. of concentrated hydrochloric acid is heated at 85–90° C. with stirring for ½ hour. The dark brown solution is brought to pH 7 by adding, with cooling, a solution of about 75 g. of sodium hydroxide in about 180 ml. of water. The resultant heterogeneous mixture is cooled to 10° C. in an ice bath and filtered. The solid so obtained is crude imidazole-2-carboxaldehyde and amounts to 7.95 g., with a melting point of 196–201° C. Extraction of the filtrate with three 100-ml. portions of butanol, drying the butanol extracts over magnesium sulfate, removing the solvent under reduced pressure, and extensively extracting the residual solid with boiling ether allows another 3.42 g. of crude aldehyde to be recovered from the ether extracts. The total yield of aldehyde is 11.37 g., or 54%. The aldehyde is recrystallized from water with the aid of decolorizing charcoal, giving an ivory colored solid, melting point 201.5–203° C., which on microanalysis for carbon, hydrogen, and nitrogen agrees with the theoretical values for the same.

EXAMPLE 3

Preparation of imidazole-2-carboxaldehyde

A solution of 86 g. of N-(2,2-diethoxyethyl)-2,2-diethoxyacetamidine hydrochloride in 90 ml. of concentrated hydrochloric acid is heated on the steam bath for 30 minutes. The solution is allowed to cool to room temperature and then concentrated under reduced pressure. The residue is dissolved in 100 ml. of water and brought to a pH of approximately 6 with 20% sodium hydroxide solution. The resultant solid, imidazole-2-carboxaldehyde (24.2 g., 56%), melts at 195–205° C.

EXAMPLE 4

Preparation of imidazole-2-carboxaldehyde thiosemicarbazone hydrochloride

A solution of 17.8 g. of N-(2,2-diethoxyethyl)-2,2-diethoxyacetamidine hydrochloride in 50 ml. of concentrated hydrochloride acid is heated on a steam bath for ½ hour (10 min. to 95°, 20 min. at 95–97°). The reaction mixture is cooled and divided in half. One half is worked up as described in Example 1 to give imidazole-2-carboxaldehyde. The second half of the reaction mixture is treated with 3.0 g. of thiosemicarbazide in 10 ml. of hot water. There is a rapid precipitation of a solid. The heterogeneous mixture is heated for 15 minutes on a steam bath, cooled, filtered, washed with 6 N hydrochloric acid, and dried. There is obtained 4.21 g. (69%) of the title compound, melting point 242° C. with decomposition, which has an infrared spectrum identical with a microanalytically pure sample of imidazole-2-carboxaldehyde thiosemicarbazone hydrochloride.

EXAMPLE 5

Preparation of N-(2,2-diethoxyethyl)-2,2-dimethoxyacetamidine hydrochloride

The procedure of Example 1 is followed with the exception that an equivalent quantity of dimethoxyacetonitrile is substituted for the diethoxyacetonitrile. The title compound is obtained as a viscous oil.

EXAMPLE 6

Preparation of N-(2,2-diethoxyethyl)-2,2-diethoxyacetamidine

The hydrochloride salt of Example 1 is added to excess sodium carbonate solution. Extraction with chloroform followed by evaporation of the solvent gives the above free base.

EXAMPLE 7

Preparation of imidazole-2-carboxaldehyde

The procedure of Example 3 is followed with the exception that 78 g. of N-(2,2-diethoxyethyl)-2,2-dimethoxyacetamidine hydrochloride is substituted for N-(2,2-diethoxyethyl)-2,2-diethoxyacetamidine. The imidazole-2-carboxaldehyde is obtained in good yield as a tan solid.

EXAMPLE 8

Preparation of N-(2,2-dimethoxyethyl)-2,2-dimethoxyacetamidine hydrochloride

When the procedure of Example 1 is followed with the exception that equivalent quantities of dimethoxyacetonitrile and of the dimethyl acetal of aminoacetaldehyde are substituted for diethoxyacetonitrile and the diethyl acetal of aminoacetaldehyde respectively, the title compound is obtained in good yield.

EXAMPLE 9

Preparation of imidazole-2-carboxaldehyde

The procedure of Example 3 is followed with the exception that 70 g. of N-(2,2-dimethoxyethyl)-2,2-dimethoxyacetamidine hydrochloride is substituted for N-(2,2-diethoxyethyl) - 2,2 - diethoxyacetamidine. Imidazole-2-carboxaldehyde is obtained as a brown solid.

EXAMPLE 10

Preparation of N-(2,2-diethoxyethyl)-2,2-dimethoxypropionamidine hydrochloride

A solution of 0.47 g. of sodium in 80 ml. of ethanol is added to 24.6 g. of 2,2-dimethoxypropionitrile and the reaction mixture is allowed to stand at room temperature for 2 hours. To the thus-formed ethyl 2,2-dimethoxypropionimidate is added 31 g. of aminoacetaldehyde diethyl acetal, followed by sufficient saturated ethanolic hydrogen chloride to bring the solution to a pH of approximately 1 as indicated by moist pH indicator paper. After one hour's standing at room temperature, the reaction mixture is filtered and the filtrate is evaporated under reduced pressure, giving the above compound in good yield as the non-volatile residue.

EXAMPLE 11

Preparation of 2-imidazolylmethyl ketone

The procedure of Example 3 is followed with the exception that an equivalent amount of N-(2,2-diethoxyethyl)-2,2 - dimethoxypropionamidine hydrochloride. 2-acetylimidazole is obtained upon basification of the acidic reaction mixture.

EXAMPLE 12

Preparation of N-(2,2-diethoxyethyl)-2,2-diethoxybutyramidine hydrochloride

Following the procedure of Example 10 with the exception that an equivalent amount of 2,2-diethoxybutyronitrile (prepared by the method of J. G. Erickson, J. Am. Chem. Soc., 73, 1338 (1951) by means of the reaction of ethyl orthopropionate and hydrogen cyanide) is substituted for the 2,2-dimethoxypropionitrile starting material, gives the product described above.

EXAMPLE 13

Preparation of 2-imidazolylethyl ketone

The procedure of Example 3 is followed except that an equivalent amount of N-(2,2 - diethoxyethyl)-2,2-diethoxybutyramidine hydrochloride is substituted for the N-(2,2-diethoxyethyl) - 2,2 - diethoxyacetamidine hydrochloride. Basification of the reaction mixture produces the desired 2-imidazolylethyl ketone.

What is claimed is:

1. A compound of the formula:

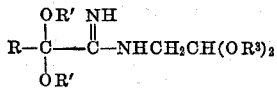

wherein R is a member selected from the group consisting of hydrogen and alkyl $C_1$–$C_4$; R' and $R^3$ are alkyl $C_1$–$C_4$; and the acid addition salts of said compounds.

2. A compound according to claim 1 having the structure:

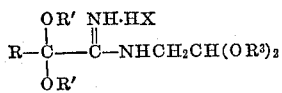

wherein R is hydrogen or alkyl $C_1$–$C_4$, R' and $R^3$ are alkyl $C_1$–$C_4$ and X is an anion of a mineral acid or strong organic acid.

3. The compound according to claim 2, N-(2,2-diethoxyethyl)-2,2-diethoxyacetamidine hydrochloride.

4. The compound according to claim 2, N-(2,2-diethoxyethyl)-2,2-dimethoxyacetamidine hydrochloride.

5. The compound according to claim 2, N-(2,2-diethoxyethyl)-2,2-diethoxybutyramidine hydrochloride.

References Cited

UNITED STATES PATENTS

| 2,710,870 | 6/1955 | Lawson | 260—564 R |
| 3,399,211 | 8/1968 | Sarett et al. | 260—564 R |
| 3,600,399 | 8/1971 | Berkelhammer et al. | 260—309 |

JOHN D. RANDOLPH, Primary Examiner

S. D. WINTERS, Assistant Examiner

U.S. Cl. X.R.

260—309, 465.6, 584 C, 306.8 D; 424—270